Aug. 21, 1956  G. R. ECKSTEIN  2,759,587
FEEDING MEANS FOR ASSEMBLY PRESS
Original Filed Dec. 14, 1950  5 Sheets-Sheet 1

INVENTOR.
GEORGE R. ECKSTEIN
BY
John H. Lewis Jr.
ATTORNEYS

Aug. 21, 1956    G. R. ECKSTEIN    2,759,587
FEEDING MEANS FOR ASSEMBLY PRESS
Original Filed Dec. 14, 1950    5 Sheets-Sheet 2

INVENTOR.
GEORGE R. ECKSTEIN
BY
John H. Lewis Jr.
ATTORNEYS

Aug. 21, 1956 G. R. ECKSTEIN 2,759,587
FEEDING MEANS FOR ASSEMBLY PRESS
Original Filed Dec. 14, 1950 5 Sheets-Sheet 3
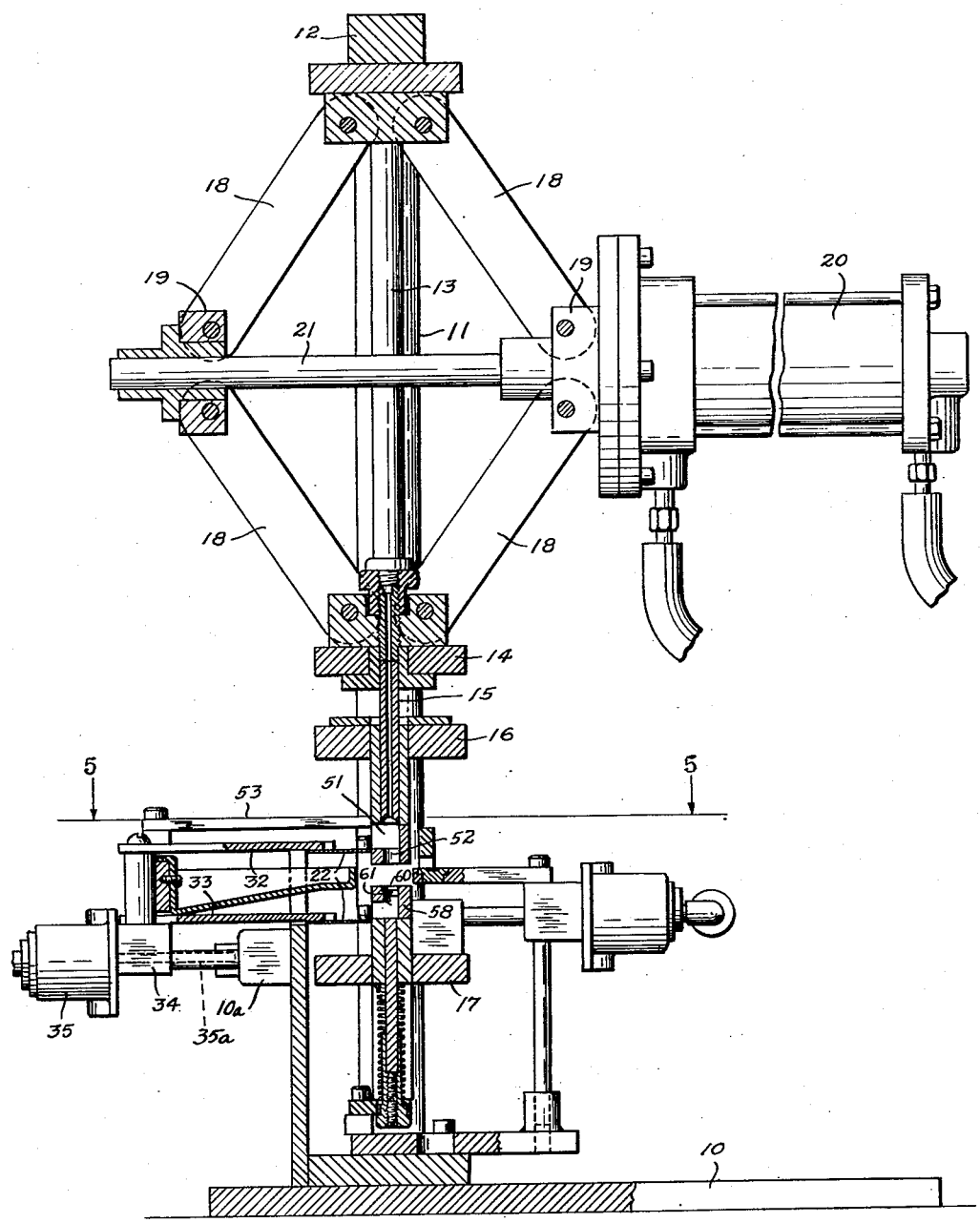
Fig. 3
INVENTOR.
GEORGE R. ECKSTEIN
BY 
ATTORNEYS Aug. 21, 1956  G. R. ECKSTEIN  2,759,587
FEEDING MEANS FOR ASSEMBLY PRESS
Original Filed Dec. 14, 1950  5 Sheets-Sheet 5

INVENTOR.
GEORGE R. ECKSTEIN
BY
ATTORNEYS

United States Patent Office 2,759,587
Patented Aug. 21, 1956

2,759,587

FEEDING MEANS FOR ASSEMBLY PRESS

George R. Eckstein, Fairfield, Conn., assignor to Remington Arms Company, Inc., Bridgeport, Conn., a corporation of Delaware Original application December 14, 1950, Serial No. 201,278. Divided and this application August 20, 1953, Serial No. 375,509

5 Claims. (Cl. 198—19)

This invention relates to feed mechanism for machines and is particularly applicable to such machines as may be utilized for assembling ammunition components or other small articles of several parts. The specific embodiment illustrated is arranged for assembling primers for small arms ammunition.

This application is a division of my copending application, Serial No. 201,278, filed December 14, 1950, and now Patent No. 2,669,898, for "Assembly Press," relating to an assembly press having axially aligned dies to which the components to be assembled are fed on two different levels.

The object of this invention is to provide the simplest possible feed means for such a press and one which functions so gently as to be safely applicable to such sensitive articles as loose ammunition primers.

In carrying out my invention, I prefer to utilize an endless belt as the carrier for the articles being fed, which articles rest on the belt and are carried thereby unless or until the articles meet with some resistance, after which the belt slides beneath the articles. To feed the two levels of the press I utilize the top surface of both the top and bottom runs of the belt which, on the endless belt, are travelling in opposite directions and serve to transfer components from two remote points toward each other to an intermediate position in vertical alignment. At this intermediate position, which is opposite the dies or other machine element to be fed, I provide fixed stops to halt the components on the belt and transfer fingers which are movable across the line of movement of the belt to pick off the foremost components and transfer them to the dies, the fingers then serving as stops to delay further progression of the components still on the belt. Although I prefer to advance the belt intermittently in steps equal to or slightly greater than the diameter of a component being fed, the belt may be in continuous motion.

The exact nature of my invention as well as other objects and advantages thereof will become apparent from consideration of the following specification referring to the attached drawings, in which:

Fig. 3 is a vertical sectional view through the machine shown in Fig. 1.

*General description*

Figure 1:
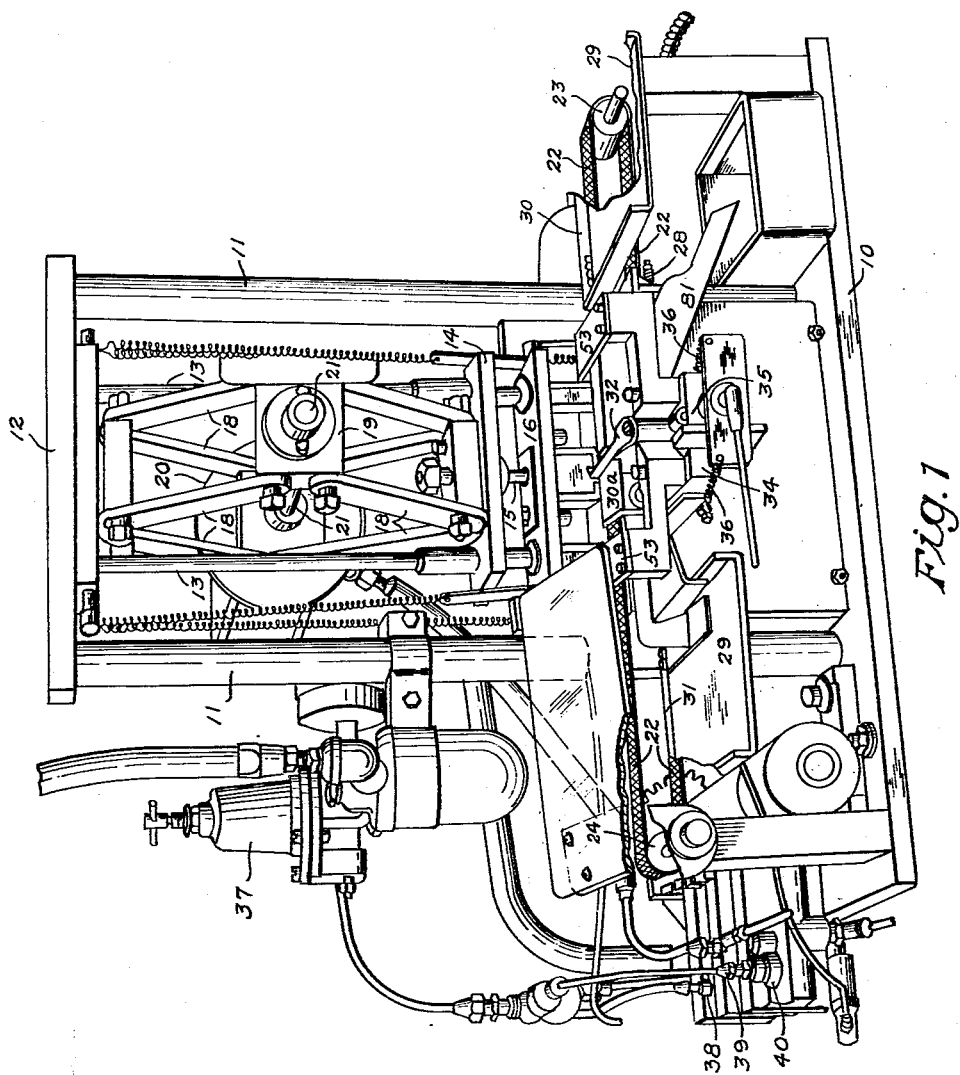
Fig. 1 is a front perspective view of a machine embodying my invention, certain parts of the machine not essential to this invetnion being broken out for clarity in illustration.

Referring to the drawings by characters of reference, it may be seen that I have provided a base 10 which supports a pair of pillars 11 and a cross-bar 12, this assembly comprising a main frame for the machine. Supported between the cross-bar 12 and the base 10 are a pair of columns 13 upon which there are guided for colinear reciprocation a press gate 14 carrying a punch 15, an upper die plate 16, and a lower die plate 17. A symmetrical toggle assembly including the arms 18 joins the upper end of the frame to the gate 14 and is provided with thrust plates 19 at opposed vertices of the toggle assembly. Mounted on one of the thrust plates is the double-acting pneumatic cylinder 20 provided with a piston rod 21 secured to the other thrust plate. Obviously, the operation of the air cylinder in one direction will draw the vertices of the toggle closer to each other and thereby move the gate 14 downwardly while reverse operation of the air cylinder will have the effect of raising the gate. During the reciprocation of the gate, the punch is brought into engagement with the work of the dies and the die plates are reciprocated into contact with each other and with other tools more fully described in the parent application.

Figure 2:
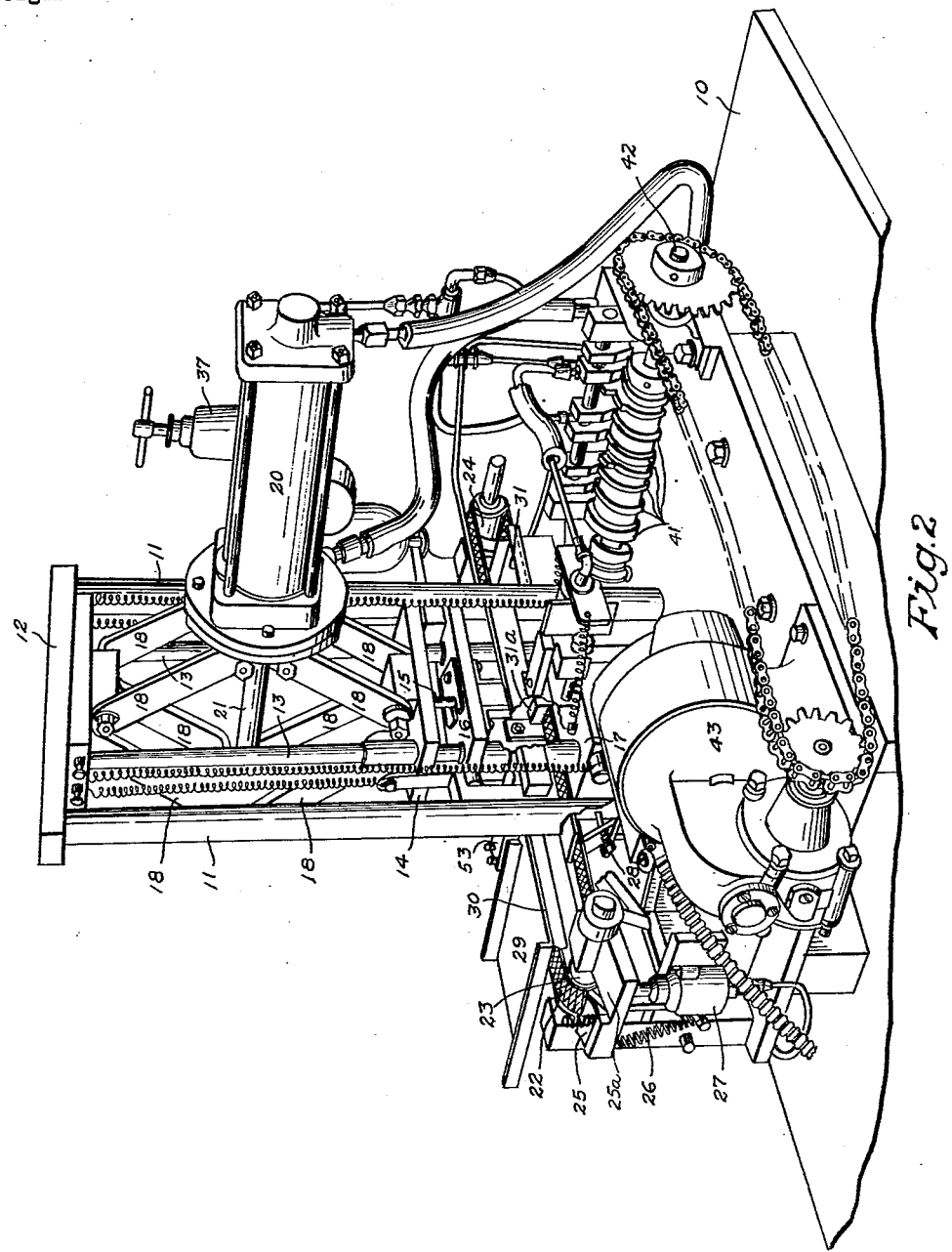
Fig. 2 is a rear perspective view of the machine shown in Fig. 1.
Figure 4:
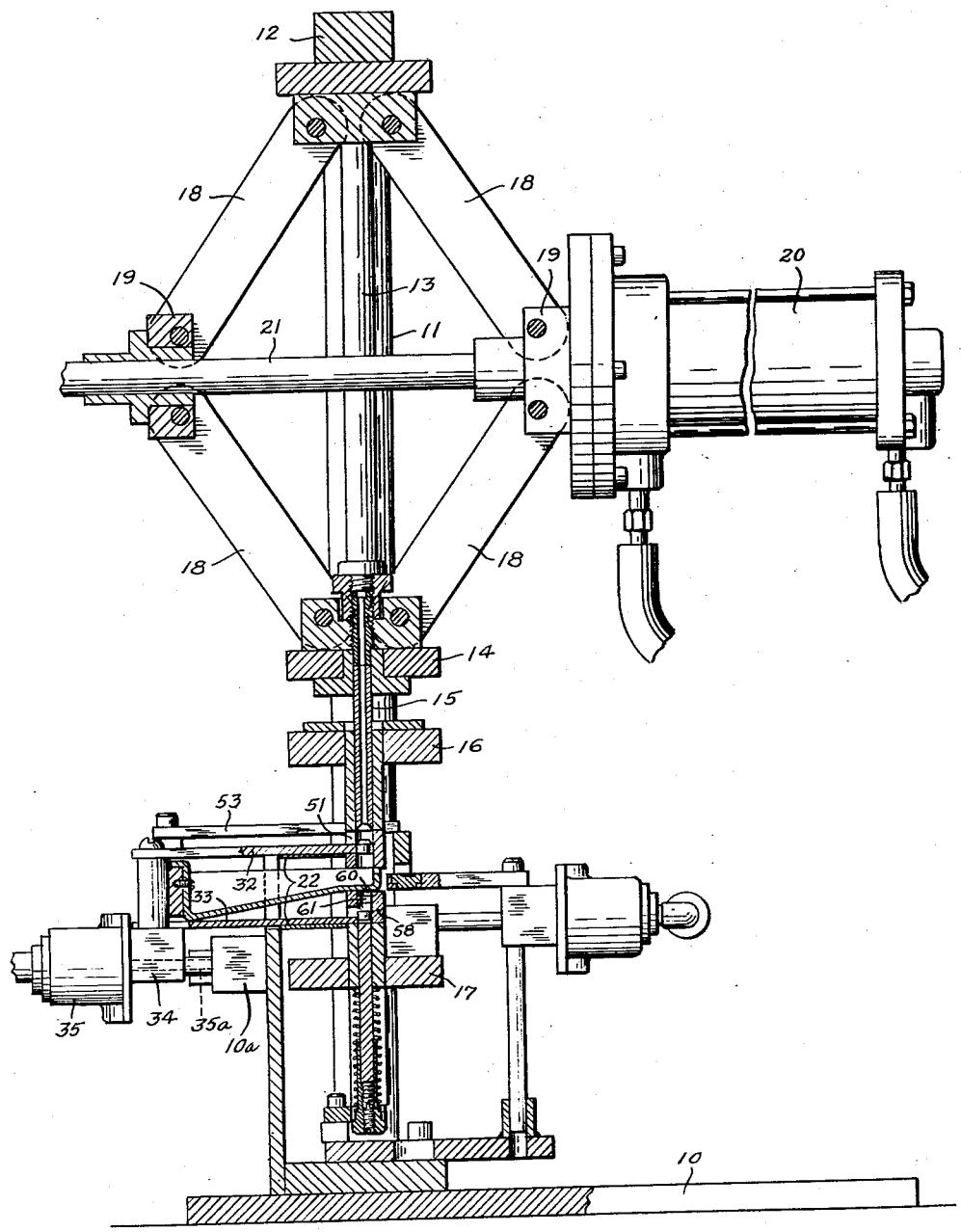
Fig. 4 is a view similar to Fig. 3, with the feed mechanism in an advanced position.
Figure 5:
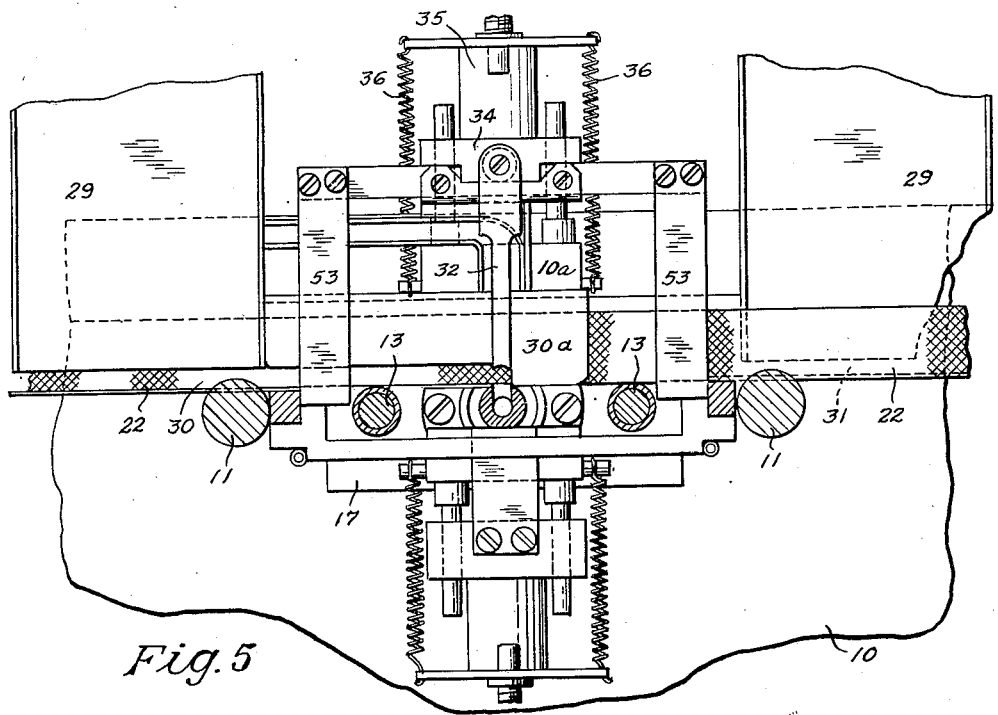
Fig. 5 is a partial horizontal sectional view on the line 5—5 of Fig. 3.
Figure 6:
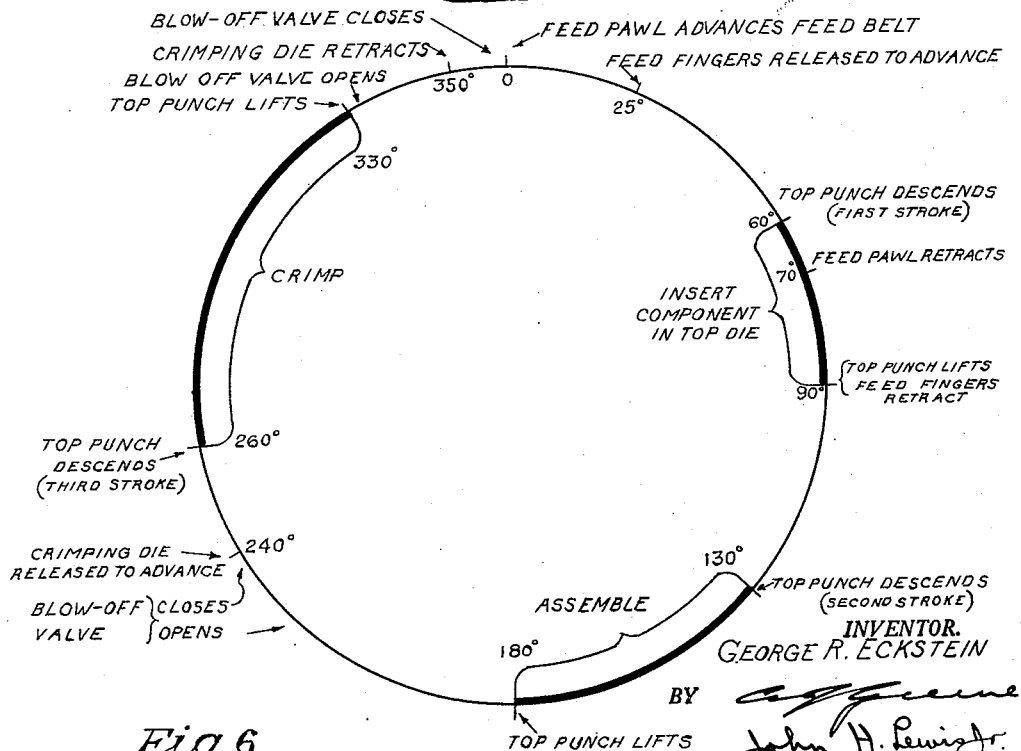
Fig. 6 is a timing diagram for the machine of the parent application in which the operation of this portion of the mechanism is included.

Supported across the front of the machine is an endless feed belt 22 carried on suitable rollers 23 and 24. This belt is intermittently driven in one direction by a gripper 25 mounted on an arm 25a which is swingable about the axis of the roller 23 (see Fig. 2). The gripper 25 serves to jam the belt 22 against the roller 23 so that as the arm is raised the roller is turned and the belt advanced. A return spring 26 tends to return the arm to its normal downward position and an air cylinder 27 is provided to raise the arm and advance the belt. A clutch 28 is mounted on the frame to jam the belt against the frame and prevent retrograde movement of the belt. Trays 29 are mounted in alignment with each run of the feed belt, permitting a component to be fed from top tray 29 onto the top run of the belt and carried thereby through track 30 into position to be fed to the die in the upper die plate. Similarly, components from bottom tray 29 may be pushed onto the lower run of the belt and carried thereby through track 31 into position to be fed to the lower die plate. The feed fingers 32 and 33 are both supported on a block 34 mounted for reciprocation and normally held in a retracted position by an air cylinder 35 working against the feed spring 36, said air cylinder being provided with an extensible piston rod 35a pushing against an element 10a of the frame 10 to retract the block 34 against the pull of the springs 36 whenever air is supplied to the cylinder (see Figs. 1, 3, 4, and 5).

Each of the air cylinders so far referred to is driven by compressed air supplied from any suitable line through a pressure regulator 37 and dual valves 38, 39, and 40, each valve section being controlled by a separate cam 41 on cam shaft 42. This cam shaft is driven by a small motor 43 at a speed suitable to the desired cyclic rate of the machine, one revolution of the cam shaft producing one complete cycle of machine operation. Each air cylinder is actuated in turn, as shown in the parent application, to perform all of the necessary operations in accurately timed sequence. Obviously, the initial selection of the cross-sectional area of the pistons and the adjustment of the regulator determines the total force available for any given cylinder.

In the specific example shown, the units being assembled are ammunition primers of the type shown in my copending application, Serial No. 162,355, filed May 16, 1950, and now Patent No. 2,708,878. The primer retaining cups may be placed conical-end-up on the feed tray 29, from which they may be manually pushed onto the upper run of the feed belt and carried single file down the track 30 by the intermittent advance of the feed belt. Opposite the left hand edge of the passage 51 the feed track terminates against a solid stop 30a, and the feed finger 32, being positioned in opposition to the passage, advances and strips off the foremost component from the track, delivering it through the radial passage 51 into the central bore 52 in the upper die.

Similarly, the lower die 58 is provided with a radial passage 60 leading into the central bore 61 of the lower die. Blocks described in the parent application determine the uppermost position of the lower die plate and are so dimensioned as to position the aperture 60 in the lower die in opposition to the path of components along the track 31 bottomed by the upper surface of the lower run of the feed belt 22. As in the case of the upper run of the belt, a solid stop 31a is provided to stop components on the belt in front of passage 60 and in alignment with the lower feed finger 33. When the feed finger moves in, the end component in the track is fed through the radial passage into the central bore in the die, the particular component in this instance being the primer and anvil assembly entering into the primer disclosed in my aforementioned copending application.

Summary of operation

Assuming that the operating cycle starts when air pressure is applied to the cylinder 27, the feed belt advances by an increment slightly greater than the diameter of the components to be assembled, thus positioning, in our example, a primer retainer against the stop 30a in the upper track 30 and a primer against the stop 31a in the lower track 31.

After about 25 degrees of rotation of the cam shaft 42, the appropriate valve may be opened to disconnect air cylinder 35 from pressure and permit it to exhaust to atmosphere. As this cylinder exhausts, the springs 36 draw in the block 34, carrying in the feed fingers 32 and 33 as well as the stop blocks 53 which control the limits of vertical movement of the die plates as described in the parent application. The feed fingers each carry a component from the feed track through the radial opening in the appropriate die and position it therein in alignment with the axial die bore.

Shortly after the components are fed into the dies, pressure is applied to the front side of the piston on the cylinder 20 and the back end of the cylinder is permitted to exhaust to atmosphere, thus lowering the press gate in its first stroke.

As the punch descends, the upper die plate is supported by the stop blocks 53 and the punch carries the primer retainer from a position in alignment with the radial passage in the die down into the axial bore. As the retainer enters the axial bore, it pushes ahead of it the primer assembled and crimped in the preceding cycle. The ejected unit falls into a chute 81 carried by the feed finger block 34 into the space beneath the upper die.

Sometime after the advance of the feed fingers, the pressure may be released from the belt feet cylinder 27, permitting the spring 26 to return the gripper 25 to its neutral position. The drag of the gripper 25 over the belt does not produce a retrograde movement of the belt because of the holding action of the clutch 28. Conveniently, this retraction of the belt feed pawl may take place during the first working stroke of the punch.

It may be noted that the first working stroke is relatively short and that during this stroke the toggle assembly is so extended as to have a relatively poor mechanical advantage. This condition is tolerable and, in fact, desirable, since relatively little force is normally required to eject the previously completed assembly and insert the new retainer. In the event of a machine jam of any kind, sufficient force is not available to crush and possibly explode the assembled primer. It will be obvious that the air cylinder is not constrained to complete any given length of stroke but simply applies a resilient force tending to move the gate until the air is cut off. This is in marked contrast to a crank or other mechanical press which must complete a fixed stroke and which usually has enough inertia to convert a jam into a tool smash-up.

After an allowance of about thirty degrees of camshaft rotation for the first working stroke, air is applied to the back end of the cylinder 20 while the front end exhausts, thus raising the press gate. Simultaneously, or slightly before the lifting of the top punch, air is applied to the cylinder 35 to retract the feed finger assembly. Preferably, considerable pressure should be available in the cylinder 35 at the time the press gate actually lifts thereby resulting in a snap retraction of the feed fingers and the delivery chute when the stop blocks are released. Such a snap retraction is desirable, to insure that the impulse imparted to the ejected primer, just previously deposited in the delivery chute, is sufficient to avoid a piling-up of primers in the inner end of the chute.

For discussion of the operation of other portions of the machine, reference may be made to the parent application.

Although I have illustrated my invention by quite specific reference to one embodiment therof, it should be realized that the machine may be applied to the assembly of other articles requiring physically different but functionally equivalent tooling. Accordingly, I intend that my invention shall be considered to be liimted only by the scope of the claims appended hereto.

I claim:

1. Means to feed components to two vertically spaced stations of a press comprising, in combination, an endless belt; drive means for said belt; guide rollers for said belt supporting an upper run of the belt for horizontal travel in one direction beside the uppermost of said stations and supporting a lower run of the belt for horizontal travel in the opposite direction beside the lowermost of said stations; guide means above each of said runs of the belt laterally defining a track leading in the direction of the advance of the particular run of the belt toward each of said stations and arranged to maintain components placed on said belt in a single column, the upper surfaces of the respective runs of the belt defining the bottom of said tracks; feed means at one end of the machine to deliver components to the upper surface of the upper run of the belt; feed means at the opposite end of the machine to deliver components to the upper surface of the lower run of the belt; stop means terminating each of the tracks defined by the guide means in a position opposite the corresponding press station; and a pair of vertically spaced, horizontally reciprocable feed fingers each arranged to pass laterally through one of said tracks and transfer a component therein from a position in contact with the stop means into said press station.

2. The combination described in claim 1, said drive means for the belt including a one-way drive element and means to intermittently actuate said drive element to advance the belt by a linear amount at least equal to the diameter of the components to be fed thereby, said drive means being actuated prior to each reciprocation of the feed fingers.

3. The combination described in claim 2, said one-way drive comprising an arm mounted for swinging movement about the axis of one of said guide rollers; a one-way clutch on said arm adapted to clutch said belt to the guide roller and to advance said belt and roller during swinging movement of the arm; a fluid pressure cylinder arranged to drive said arm; a source of fluid pressure; and valve means intermittently connecting said cylinder to said source of fluid pressure to cause said arm to swing.

4. The combination described in claim 3, including spring means for advancing said feed fingers; a fluid pressure feed finger cylinder arranged to retract said feed fingers; and feed finger valve means intermittently connecting said feed finger cylinder to said source of fluid pressure to allow the advance of and cause the retraction of said feed fingers.

5. The combination described in claim 4, including a driven shaft; and cams on said shaft operatively engaged with both of said valve means to operate said belt feed arm and said feed fingers in predetermnied sequential relationship.

References Cited in the file of this patent

UNITED STATES PATENTS

| | | |
|---|---|---|
| 1,093,815 | Whittier | Apr. 21, 1914 |
| 2,346,575 | Hallowell | Apr. 11, 1944 |